United States Patent [19]

Slama et al.

[11] 4,347,277
[45] * Aug. 31, 1982

[54] CORROSION RESISTANT COATED ARTICLES WHICH INCLUDE AN INTERMEDIATE COATING LAYER OF A THERMOSETTING POLYMER AND NON-SILICEOUS FILLER

[75] Inventors: William R. Slama, North Olmsted; Robert B. Washburn; Dale J. Semanisin, both of Cleveland, all of Ohio

[73] Assignee: General Signal Corporation, Stamford, Conn.

[*] Notice: The portion of the term of this patent subsequent to Dec. 2, 1997, has been disclaimed.

[21] Appl. No.: 178,168

[22] Filed: Aug. 14, 1980

Related U.S. Application Data

[63] Continuation-in-part of Ser. No. 957,084, Nov. 3, 1978, Pat. No. 4,237,177.

[51] Int. Cl.³ .................... B05D 7/00; B05D 1/02
[52] U.S. Cl. .................... 428/215; 427/299; 427/327; 427/385.5; 427/386; 427/388.1; 427/407.1; 427/409; 427/410; 428/421; 428/422; 428/423.7; 428/425.8; 428/446; 428/458; 428/461; 428/483; 428/500
[58] Field of Search .................... 427/299, 327, 385.5, 427/386, 388.1, 407.1, 409, 410, 412.4; 428/215, 421, 422, 423.7, 425.8, 446, 458, 461, 483, 500; 98/46, 58

[56] References Cited

U.S. PATENT DOCUMENTS

| | | | |
|---|---|---|---|
| 2,777,783 | 1/1957 | Welch | 428/422 |
| 2,809,130 | 10/1957 | Rappaport | 428/421 |
| 3,093,264 | 6/1963 | Harris | 428/421 |
| 3,111,426 | 11/1963 | Capron et al. | 428/421 |
| 3,526,532 | 9/1970 | Heiberger | 428/421 |
| 3,799,832 | 3/1974 | Reick | 428/421 |
| 3,874,903 | 4/1975 | Wirth et al. | 428/421 |
| 4,154,876 | 5/1979 | Segawa et al. | 427/412.4 |
| 4,237,177 | 12/1980 | Slama et al. | 427/409 |

FOREIGN PATENT DOCUMENTS

| | | | |
|---|---|---|---|
| 763759 | 9/1971 | Belgium | 427/410 |
| 1228853 | 4/1971 | United Kingdom | 427/409 |

*Primary Examiner*—Sadie L. Childs
*Attorney, Agent, or Firm*—Cooper, Dunham, Clark, Griffin & Moran

[57] ABSTRACT

A concrete or metal substrate which is normally subject to deterioration in the presence of corrosive substances such as strong acids, particularly sulfuric acid, is rendered corrosion resistant when covered with the improved multilayered coating of this invention. In particular, a coated article, such as a coated chimney liner or flue duct, which includes a substrate, a primer coating layer of a thermosetting polymer, one or more inner coating layers of a thermosetting polymer which includes a siliceous filler, an intermediate coating layer of a thermosetting polymer which includes a non-siliceous filler, and a fluoroelastomeric top coating layer which includes a non-siliceous filler, has improved resistance to the corrosive effects of strong acids. Chimney liners, flue ducts, scrubbers, and the like which have been coated in accordance with this invention are useful in power plants, smelters, and other industrial settings where corrosive environments are present.

11 Claims, 4 Drawing Figures

CORROSION RESISTANT COATED ARTICLES WHICH INCLUDE AN INTERMEDIATE COATING LAYER OF A THERMOSETTING POLYMER AND NON-SILICEOUS FILLER

BACKGROUND OF THE INVENTION

This application is a continuation-in-part of U.S. Ser. No. 957,084, filed Nov. 3, 1978, U.S. Pat. No. 4,237,177, the disclosure of which is hereby incorporated by reference into the present application.

FIELD OF THE INVENTION

This invention relates to novel multi-layered coatings which are capable of protecting surfaces such as the interior surfaces of chimney liners, flue ducts, and scrubbers from the deleterious effects of those corrosive substances which are encountered in many industrial locations such as power plants and smelters.

A combination of factors have changed the conditions under which chimneys and flues in many industrial locations, such as power plants and smelters, are operated. These changed factors have made the problem of corrosion, particularly acid corrosion, more critical. For example, as the available supply of clean-burning fuels of low sulfur contents has decreased, lower quality fuels having higher sulfur contents have been increasingly utilized. Combustion of these lower quality fuels results in production of flue gases which contain corrosive substances, especially sulfur-containing substances, e.g., various oxides of sulfur. At the same time, utility companies have increased the efficiency of heat utilization so that the temperatures of the flue gases produced in their power plants are closer to the due points of the corresponding acids. Finally, installations equipped with sulfur dioxide scrubbers produce flue gases which are not only cooler, but also are wetter. Consequently, these installations discharge a corrosive mist into the lower portions of the chimney liners. Because of such changed factors, efforts have been undertaken to develop coatings capable of protecting the surfaces of chimney liners, scrubbers, and flue ducts from the effects of those corrosive and deteriorating substances which come into contact with these surfaces during the operation of power plants, smelters, and the like.

DESCRIPTION OF THE PRIOR ART

In order to combat the problem of surface corrosion of chimney linings, flue ducts, etc., various plastic or polymeric coatings have been developed for use in protecting their interior surfaces. On approach has involved use of a coating layer of a polymeric material such as a polyester or a vinyl ester and a reinforcing filler material such as glass flakes applied over these interior surfaces which are typically composed of steel, concrete, or brick.

Another approach has involved use of a fluoroelastomer coating. This approach is based in part on such prior art teachings as those of U.S. Pat. No. 3,526,532, which discloses the use of a hydrofluorocarbon coating layer overlaid on a polymeric primer coating to impart corrosion resistance to a coated metal surface. One such coating is Colebrand CXL2000, developed by Colebrand Ltd., London, England, and marketed in the United States by Pullman Power Products, Williamsport, Pa.

SUMMARY OF THE INVENTION

This invention provides novel, coated articles such as coated chimney liners, flue ducts, and scrubbers, which possess improved corrosion resistance when placed in contact with corrosive substances such as strong acids, particularly sulfuric acid. The multi-layered, coated articles of the present invention comprise a substrate, a primer coating layer, one or more inner coating layers, an intermediate coating layer, and an outer coating layer.

The coated articles are prepared as follows. A primer coating layer of a thermosetting polymer is placed over the surface to be protected. Then, one or more inner coating layers of a thermosetting polymer and a siliceous filler are overlaid upon the primer coating layer. The chemical properties of the thermosetting polymers employed in the primer coating layer and in the inner coating layer or layers are such that bonding occurs between the primer coating layer and the surface being coated and between the primer coating layer and the adjacent inner coating layer as well as between contiguous inner coating layers if more than one such layer is present. Over the outermost, inner coating layer there is placed a non-siliceously filled, intermediate layer of a thermosetting polymer capable of bonding to the inner coating layer. Finally, an outer coating layer of a fluoroelastomer and a non-siliceous filler is applied over the intermediate coating layer. The chemical properties of the fluoroelastomer employed are such that, upon curing, a chemical bond forms between the intermediate coating layer and the fluoroelastomeric outer coating layer.

In the preferred embodiment of this invention, a coated article is prepared which possesses improved corrosion resistance and comprises a substrate, a primer coating layer of polyester 1–5 mils in thickness, an inner coating layer of glass flake-filled vinyl ester 20–80 mils in thickness, an intermediate coating layer of carbon-filled vinyl ester 10–15 mils in thickness, and an outer coating layer of a carbon-filled fluoroelastomer 10–50 mils in thickness.

It is a principal object of the present invention to provide coated articles such as coated flue ducts, chimney liners, and scrubbers which possess the following desirable physical characteristics: resistance to chemical attack by strong acids; resistance to water or chemical transport; resistance to thermal degradation; and resistance to mechanical and abrasion damage.

It is a related object of this invention to provide a method of preparing coated articles which possess these desirable physical characteristics.

It is a final object of this invention to provide a method of protecting surfaces such as the steel, concrete, and brick surfaces found in chimney liners and flue ducts from the effects of corrosive substances such as strong acids.

How these and other objects of the present invention are accomplished will be more readily understood upon reading the detailed description of the invention in conjunction with the accompanying drawings and the claims which follow thereafter.

DETAILED DESCRIPTION OF THE PREFERRED EMBODIMENTS

Figure 1:
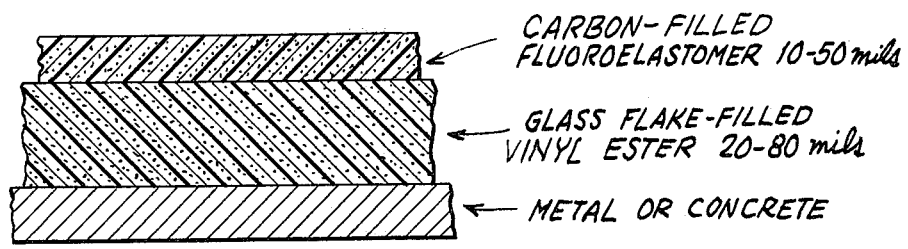
FIG. 1 is a cross-sectional view of a coated article which includes a substrate, a glass flake-filled polymer formed from a vinyl ester as an inner coating layer, and a carbon-filled fluoroelastomer as an outer coating layer.

This invention provides multi-layered coated articles which possess improved corrosion resistance, particularly when the articles are in contact with corrosive substances such as strong acids, especially, concentrated sulfuric acid. These coated articles include coated flue ducts, chimney liners, scrubbers, tanks, expansion joints, and the like, all of which typically come into contact with corrosive substances during normal usage. They also possess corrosion resistance in the presence of hydrochloric acid, but have only limited resistance to corrosion caused by contact with nitric acid.

The underlying substrates which are protected may be metals, especially steel, concrete, or brick. At present, the most important applications of the coated articles of this invention are as substitutes or replacements for uncoated chimney liners, flue ducts, and scrubbers, all of which come into contact with concentrated sulfuric acid during the operation of power plants burning fossil fuels which contain sulfur. When fossil fuels containing sulfur are combusted, the gases produced include sulfur dioxide and sulfur trioxide. These condense at the exhaust temperatures from fuel combustion, typically temperatures up to about 400° to 500° F., to produce sulfuric acid at concentrations as high as 90%.

The multi-layered, coated articles of this invention comprise a substrate, a primer coating layer, one or more inner coating layers, an intermediate coating layer, and an outer coating layer. The primer coating layer is a polymer formed from a thermosetting polymeric material, which may be the same as or different from the thermosetting polymer in the adjacent inner coating layer. It is applied to the surface to be coated prior to application of the inner coating layer or layers. The chemical properties of the polymer used as the primer coating are such that bonding occurs between the primer coating, the surface of the coated substrate, and the adjacent inner coating layer.

Each inner coating layer is an admixture of a polymer formed from a thermosetting polymeric material and a siliceous filler material. The chemical properties of the polymer employed are such that bonding occurs between the primer coating layer and the inner coating layer with which it is in contact, and such that, if more than one inner coating layer is present, bonding occurs between adjacent inner coating layers.

The intermediate coating layer is an admixture of a thermosetting polymeric material, which may be the same as or different from the polymer present in the inner coating layer or layers or in the primer coating layer, and a non-siliceous filler material. The chemical properties of the polymer are such that it is capable of bonding to the outermost inner coating layer.

Finally, the outer coating layer is an admixture of a fluoroelatomer and a non-siliceous filler material. It is applied over the intermediate coating layer. Upon curing, the fluoroelastomeric material employed in the outer coating layer is capable of forming a chemical bond with the polymer of the intermediate coating layer.

Figure 2:
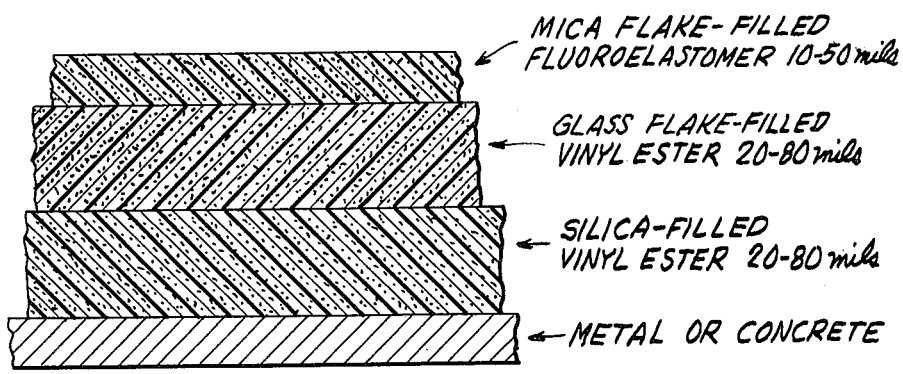
FIG. 2 is a coated article which includes a substrate, a first inner coating layer of a silica-filled polymer formed from a vinyl ester, a second inner coating layer of a glass flake-filled polymer formed from a vinyl ester, and an outer coating layer of a mica flake-filled fluoroelastomer.
Figure 3:
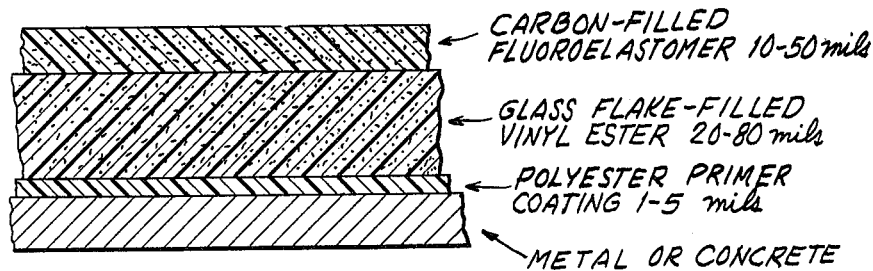
FIG. 3 is a coated article which includes a substrate, a primer coating layer of a polyester, an inner coating layer of a glass flake-filled polymer formed from a vinyl ester, and an outer coating layer of a carbon-filled fluoroelastomer.

FIGS. 1-3 illustrate various multi-layered articles having corrosion resistance such that the underlying substrate is protected to varying degrees from deterioration or corrosion in the presence of corrosive substances such as strong acids. The properties of coated articles illustrated in these figures are discussed more fully in the examples.

Although each of the coated articles shown in FIGS. 1-3 possess certain corrosion resistance, they are not as highly resistant as is desirable. The present invention provides coated articles which possess greater corrosion resistance and improved overall properties.

Figure 4:
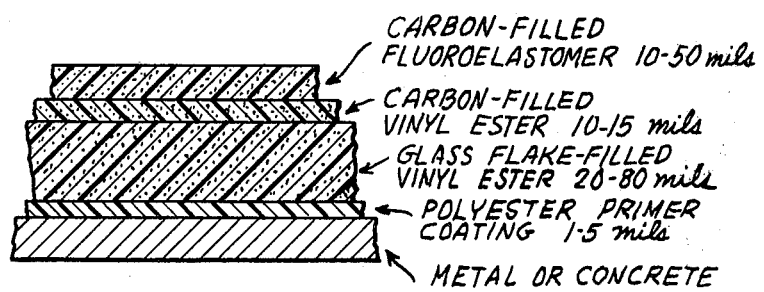
FIG. 4 is a coated article in accordance with this invention which includes a substrate, a primer coating layer of polyester a glass flake-filled vinyl ester inner coating layer, a carbon-filled vinyl ester intermediate layer, and a carbon-filled fluoroelastomer outer coating layer.

Specifically, FIG. 4 illustrates a coated article in accordance with the invention having a metal or concrete substrate. This coated article includes a primer coating layer of a polyester having a dry thickness from about 1 to about 5 mils, an inner coating layer of a glass flake-filled polymer formed from a vinyl ester having a dry thickness from about 20 to about 80 mils, an intermediate carbon-filled polymer formed from a vinyl ester having a dry thickness from about 10 to about 15 mils, and an outer coating layer of a carbon-filled fluoroelastomer having a dry thickness from about 10 to about 50 mils.

As set forth hereinabove, the substrate may be metallic or non-metallic, for example, a steel, concrete or brick surface, the nature of the substrate being limited only by the availability of a compatible polymer which will firmly adhere to the surface of the substrate to form a primer coating layer.

After the surface of the substrate to be protected is cleaned and roughened according to known techniques, for example, by acid etching or sandblasting, and before any substantial oxidation can occur, the primer coating layer is applied. In this way, any weak surface layer is removed from the substrate, permitting stronger adhesive bonding to be obtained between the coated surface and the adjacent inner coating layer. Although the primer coating may be any thermosetting polymeric material, it is generally preferred that the primer coating layer be an unsaturated, thermosetting polymer such as a polyester or vinyl ester. The primer coating may be applied over the prepared substrate surface in any conventional manner to a dry thickness of about 1 to about 5 mils.

Each inner coating layer is an admixture of a polymer formed from a thermosetting polymeric material and a siliceous filler material. Although numerous materials are useful, the thermosetting polymer employed will generally be a vinyl ester, polyester, epoxy, furan, phenolic, or urethane. Of these, a vinyl ester is presently preferred. Preferably, a monomer is used in the inner coating layer to crosslink with the polymeric material. Thus, when the polymeric material is a unsaturated, thermosetting polymer such as a vinyl ester, it is preferable to include a monomer capable of crosslinking with the vinyl ester polymer. Examples of useful compounds are styrene, acrylates, and methylacrylates.

The siliceous filler material may be any suitable reinforcing filler which includes silica such as glass or mica flakes, silica particles, or glass wool. Glass flakes which are less than about 1/64" long in any dimension are presently preferred. Such glass flakes are available from Owens Corning Fiberglass Corp., Toledo, Ohio.

The inner coating layer is formed as follows. A formulation is prepared which includes the thermosetting polymeric material. For example, a vinyl ester in an amount in the range from about 35% to about 55% by weight is mixed with a monomer which includes a vinyl group, for example, styrene, in an amount from about 40% to about 25% by weight and a siliceous filler, e.g., glass flakes, in an amount from about 15% to about 30%. Also desirably included in the formulation are one or more thixotropic agents, such as fumed asbestos, fumed silica, or clay, in an amount less than about 1%; glycerin or a similar polar compound in an amount from about 0.04% to about 0.08%; one or more pigments, particularly metallic oxides, such as titanium dioxide or lead oxide, in an amount from about 1% to about 4%; one or more catalysts, such as a peroxide, e.g., methylethyl ketone peroxide, in an amount from about 1% to about 4%; one or more promoters, such as amines or metallic soaps, in an amount from about 0.05% to about 0.5%, one or more inhibitors, such as catechols, quinones, and hydroquinones, in an amount from about 0.01% to about 0.1%; and one or more coupling agents, such as silane, in an amount less than about 1%.

Within the formulation, polymers are formed from the thermosetting polymeric material. In this specific example, polymers are formed from vinyl ester and cross-lined with styrene. The final admixture of these materials has a limited "pot" life, and must be applied to the primed surface within a relatively short time, usually within about 30 minutes to about 2 hours.

The inner coating layer may be applied as a solution or dispersion in any conventional manner including rolling, brushing, troweling, air-atomized spraying, or airless spraying. Typically, one coat of about 10 to 40 mils in dry thickness is applied to the primed surface of the substrate, and then a second coat is applied, also 10 to 40 mils in dry thickness, to produce an inner coating layer having a dry thickness from about 20 to 80 mils. This range of thickness provides the coated surface with substantial protection from corrosion. Thus, the inner coating layer provides substantial impermeability to sulfuric acid and water permeability of only about 0.001 perm. inches. Thicknesses less than about 15 mils do not provide adequate protection and thicknesses which are too great may result in a coating layer which, over time, tends to crack and flake off from the coated surface. Thus, it is presently preferred that the thickness of the inner coating layer not exceed about 80 mils.

As set forth hereinabove, more than one inner coating layer may be employed, each such inner coating layer having a dry thickness from about 20 to about 80 mils. Each of the inner coating layers may be identical or may vary in terms of the polymer or the siliceous reinforcing filler material present provided only that the layers be compatible with one another.

The intermediate coating layer is formed in generally the same manner as the inner coating layer except that a non-siliceous filler is employed rather than a siliceous filler. Useful non-siliceous fillers include carbon and inorganic oxides such as aluminum oxide. The intermediate coating layer is applied to a dry thickness from about 10 to about 15 mils.

The outer coating layer is prepared as follows. A formulation is prepared which includes a fluoroelastomer, typically one having a molecular weight less than about $2 \times 10^5$ since presently available fluoroelastomers of higher molecular weight are insoluble, and therefore not useful in the practices of this invention. Examples of useful fluoroelastomers are Viton A-35 and B-50, manufactured by E. I. DuPont de Nemours and Co., Inc., Wilmington, Del., and Fluorel 2175 manufactured by the 3 M Company, Minneapolis, Minn. Viton is the trademark for a series of fluoroelastomers based on the copolymer of vinylidene fluoride and hexafluoropropylene. Fluorel is the trademark for a series of fully saturated, fluorinated polymers containing more than 60% fluorine by weight. The formulation is prepared by mixing the fluoroelastomer in an amount from about 25% to about 60% by weight with a non-siliceous, reinforcing filler such as carbon or an inorganic oxide, e.g., aluminum oxide, carbon presently being preferred. The size of the filler particles should preferably not exceed about 1/64" in any dimension. The non-siliceous reinforcing filler material is present in the formulation in an amount from about 10% to about 30% by weight. Also desirably included in the formulation are one or more acid acceptors such as lead oxide which are capable of reacting with hydrofluoric acid produced during curing of the elastomer. The acid acceptors are generally present in an amount from about 3% to about 15% by weight. One or more curing agents, such as amines, diamines, peroxides, bis-phenols or azo compounds, in an amount less than about 10% by weight; one or more pigments, such as oxides of titanium, in an amount less than about 10%; and one or more water reactive compounds, such as calcium oxide or magnesium oxide, to react with water produced during curing of the elastomer are also desirably included. When the fluoroelastomer is Viton A-35 or B-50 as described above, the preferred curing agent is Diak #3 which is also manufactured by DuPont for use with the Viton series of fluoroelastomers.

The fluoroelastmer, non-siliceous filler, and other components are mixed, milled, and pulverized. Solvent is then added. Useful solvents include organic acetates, such a n-butyl acetate and amyl acetate, ketones, and esters. When the fluoroelastomer used is Viton A-35, a solvent mixture of n-butyl acetate and amyl acetate in the ratio of about 4 parts n-butyl acetate per part amyl acetate is particularly useful. The outer coating layer composition so prepared is applied as a solution or dispersion over the intermediate coating layer. Typically, the outer coating layer is applied to a dry thickness of about 10 to about 50 mils using conventional techniques such as those described for applying the inner coating layer.

After a period of time, typically one day to one week, wherein the solvent is released, the entire coating may be heat cured at a temperature from about 250° to about 500° F. for at least about 3 hours. Preferably, the heat curing is accomplished at a temperature from about 250° to 300° F. for a period of at least about 8 hours. The resulting, outer fluoroelastomer coating layer is permeable to sulfuric acid, but protects the inner coating layer from the corrosive effects of concentrated sulfuric acid.

The outer coating layer also provides abrasion resistance.

Although each of the coated articles of FIGS. 1–3 have been found to possess some corrosion resistance, the presence of siliceous fillers in the inner coating layer or layers results in the premature breakdown of the resin/filler interface, possibly because of attack by hydrofluoric acid produced in the outer coating layer, when the outer coating layer is adjacent an inner coating layer which includes a siliceous filler.

An unfilled, intermediate resin layer would provide a longer lasting interface between the thermosetting resin of the inner coating layer and the fluoroelastomer of the outer coating layer. However, unfilled, thermosetting resins are not mechanically stable when exposed to the extreme environmental conditions to which flue ducts and chimney liners are exposed.

The present invention is based upon the discovery that an intermediate coating layer of a thermosetting polymeric material and a non-siliceous filler provides a layer which is substantially resinous, produces a long-lasting interface with adjacent layers, particularly the fluoroelastomer outer coating layer, and supplies a resin/filler interface possessing improved resistance to hydrofluoric acid attack.

Specifically, a particular version of the improved coated article of this invention shown in FIG. 4 provides better chemical resistance and improved thermal stability when compared with a coated article which does not include an intermediate layer of thermosetting polymer and non-siliceous filler.

The following examples are set forth to more clearly illustrate the present invention, but are not to be construed as limiting in any way the scope of the invention as set forth in the claims which follow thereafter.

EXAMPLE 1

A steel panel was sandblasted and then a coating of fluoroelastomer was applied over the surface to produce a coating layer having a dry thickness of 30 mils. The chemical resistance of the protective coating layer was then evaluated by the Atlas Test Cell Evaluation (ASTM Test C 868). The coated steel panels were placed in contact with a vapor containing distilled water at 180° F.

After two weeks the steel panels were removed from contact with the vapor and examined. The coating layer was blistered and could be readily peeled off the steel panel. The steel panel itself showed visible indications of oxidation.

EXAMPLE 2

Following the same procedure as in Example 1, steel panels were covered with a coating composition such as is shown in FIG. 1. Periodically, over a period of several months, the steel panels were removed from contact with the water containing vapor and examined. No evidence of blistering or damage to the coating layer was found, nor was there any evidence of oxidation of the surface of the steel panel.

EXAMPLE 3

Following the same procedure as set forth in Example 1, steel panels were covered with a coating composition such as is shown in FIG. 3, and evaluated by the same procedure. During several months, the panels were periodically removed from contact with the vapor containing distilled water and examined. No evidence of blistering or peeling of the coating was noted, nor was there any indication of corrosion of the steel panel surfaces.

EXAMPLE 4

Steel panels which had been covered with a coating composition as shown in FIG. 1 were installed as part of the chimney lining at a power plant burning fossil fuels. In this field test, the panels came into contact with the corrosive substances produced during the normal operation of the power plant. The panels were periodically examined over four months. Some minor blistering of the coating composition was observed, although the coating composition continued to adhere to the panels. There was no indication of oxidation of the steel panels.

EXAMPLE 5

Steel panels covered with the coating composition shown in FIG. 3 were also installed at the same power plant as in the preceding example and periodically examined. After four months, no evidence of any blistering or other deterioration of the coating layer was evident. There was no indication of any corrosion of the steel panels.

EXAMPLE 6

Steel panels covered with a coating layer of glass flakefilled vinyl ester were also installed at the same power plant as in the preceding Examples 4 and 5 and periodically examined. After four months, major blistering of the coating layer was observed and large patches of coating material could be readily removed from the steel panels. There was significant corrosion of the underlying panels.

EXAMPLE 7

The water vapor transmission of a carbon-filled fluoroelastomer was determined using the water vapor transmission test (ASTM Test E 96). The average permeability of several samples was determined to be 0.001 perm-inches. A combination of the same filled fluoroelastomer and a glass flake-filled vinyl ester was then tested. The average permeability of a series of samples was 0.0007 perm-inches indicating a reduction in water vapor permeability of 30%.

EXAMPLE 8

Steel panels were covered with coatings to produce coated articles as shown in FIGS. 3 and 4. The chemical resistance of the protective coating layer was then evaluated by partially immersing the panels in concentrated sulfuric acid. Over a period of several months, visual inspections of these panels showed that the panel without the carbon-filled vinyl ester intermediate coating layer began to blister whereas the coated article of this invention remainded bonded.

EXAMPLE 9

Two steel panels were prepared as in Example 8 and evaluated by the Atlas Test Cell Evaluation (ASTM Test C868) with deionized water at 160° F. Periodically, over several months, the panels were removed and examined. No evidence of blistering or damage to the coating with the carbon-filled vinyl ester intermediate coating layer was found whereas the panel without this layer began to blister.

EXAMPLE 10

Two steel panels were prepared as in Example 8. These panels were placed into an oven at 400° F. and periodically evaluated. After a few months, the panel without the carbon-filled vinyl ester intermediate layer began to lose adhesion.

As will be obvious to one skilled in the art, many modifications, variations, or alterations can be made in the practices of this invention without departing from the spirit or scope thereof as set forth in the claims which follow.

What is claimed is:

1. A coated article resistant to corrosion or deterioration which comprises:
   a substrate;
   a primer coating layer in contact with the surface of said substrate, said primer coating layer being a thermosetting polymeric material and having a thickness from about 1 to about 5 mils;
   an inner coating layer in bonded contact with said primer coating layer, said inner coating layer being an admixture of a thermosetting polymeric material and a siliceous filler material and having a thickness from about 20 to about 80 mils;
   an intermediate coating layer in bonded contact with said inner coating layer, said intermediate coating layer being an admixture of a thermosetting polymeric material and a non-siliceous filler material and having a thickness from about 10 to about 15 mils; and
   an outer coating layer in chemically bonded contact with said intermediate coating layer, said outer coating layer being an admixture of a fluoroelastomer and a non-siliceous filler material and having a thickness from about 10 to about 50 mils.

2. A coated article in accordance with claim 1 wherein said substrate is a chimney liner, flue duct or scrubber.

3. A coated article in accordance with claim 1 wherein said thermosetting polymeric material is polyester, vinyl ester, epoxy, furan, phenolic or urethane.

4. A coated article in accordance with claim 1 wherein said siliceous filler is silica, glass wool, glass flakes, or mica flakes.

5. A coated article in accordance with claim 1 wherein said non-siliceous filler is carbon or an inorganic oxide.

6. A coated article in accordance with claim 1 wherein said fluoroelastomer has a molecular weight less than about $2 \times 10^5$.

7. A coated article in accordance with claim 1 wherein said fluoroelastomer is a substantially fully saturated fluorinated copolymer of vinylidene fluoride and hexafluoropropylene.

8. A coated article in accordance with claim 1 wherein said thermosetting polymeric material of said primer coating layer is polyester or vinyl ester.

9. A coated article resistant to corrosion or deterioration which comprises:
   a substrate;
   a primer coating layer in contact with the surface of said substrate, said primer coating layer being a polyester and having a thickness from about 1 to about 5 mils;
   an inner coating layer in bonded contact with said primer coating layer, said inner coating layer being a polymer formed from vinyl ester and styrene in admixture with glass flakes and having a thickness from about 20 to about 80 mils;
   an intermediate coating layer in bonded contact with said inner coating layer, said intermediate coating layer being a polymer formed from vinyl ester and styrene in admixture with carbon and having a thickness from about 10 to about 15 mils; and
   an outer coating layer in chemically bonded contact with said intermediate layer, said outer coating layer being a fluoroelastomer in admixture with carbon and having a thickness from about 10 to about 50 mils.

10. A method of preparing a coated article in accordance with claim 1 which comprises:
    cleaning and roughening the surface of a substrate to be coated;
    covering said cleaned and roughened surface of said substrate with a primer coating layer, said primer coating layer being a thermosetting polymeric material, to a thickness from about 1 to about 5 mils;
    covering said primer coating layer with an inner coating layer, said inner coating layer being an admixture of a thermosetting polymeric material and a siliceous filler material to a thickness from about 20 to about 80 mils;
    covering said inner coating layer with an intermediate coating layer, said intermediate coating layer being an admixture of a thermosetting polymeric material and a non-siliceous filler material to a thickness from about 10 to about 15 mils;
    applying an outer coating layer over said intermediate coating layer, said outer coating layer being an admixture of a non-siliceous filler material and a fluoroelastomer capable of chemically bonding to said intermediate coating layer, to a thickness from about 10 to about 50 mils; and
    curing the resulting multiple coating layers to produce said coated article.

11. A method of preparing a coated article in accordance with claim 9 which comprises:
    cleaning and roughening the surface of a substrate to be coated;
    covering said cleaned and roughened surface of said substrate with a primer coating layer of a polyester to a thickness from about 1 to about 5 mils;
    covering said primer coating layer with an inner coating layer of a polymer formed from vinyl ester and styrene in admixture with glass flakes to a thickness from about 20 to about 80 mils;
    covering said inner coating layer with an intermediate coating layer of a polymer formed from vinyl ester and styrene in admixture with carbon to a thickness from about 10 to about 15 mils;
    applying an outer coating layer over said intermediate coating layer, said outer coating layer being an admixture of carbon and a fluoroelastomer capable of chemically bonding to said intermediate layer, to a thickness from about 10 to about 50 mils; and
    curing the resulting multiple coating layers to produce said coated article.

* * * * *